US008660953B2

(12) United States Patent  
Enand et al.

(10) Patent No.: US 8,660,953 B2  
(45) Date of Patent: Feb. 25, 2014

(54) COMPUTER-IMPLEMENTED METHOD, SYSTEM, AND PROGRAM PRODUCT FOR IDENTIFYING BUSINESS OFFERINGS BASED ON CUSTOMER NEEDS

(75) Inventors: Rajiv Enand, Gibsonia, PA (US); Christopher A. Newlon, Chapel Hill, NC (US); Neha Shahani, Charlotte, NC (US)

(73) Assignee: International Business Machines Corporation, Armonk, NY (US)

( * ) Notice: Subject to any disclaimer, the term of this patent is extended or adjusted under 35 U.S.C. 154(b) by 1872 days.

(21) Appl. No.: 11/334,192

(22) Filed: Jan. 18, 2006

(65) Prior Publication Data

US 2007/0174172 A1   Jul. 26, 2007

(51) Int. Cl.  
*G06Q 40/00* (2012.01)

(52) U.S. Cl.  
USPC .......... 705/44; 705/1; 705/7; 705/10; 705/35; 705/36 R

(58) Field of Classification Search  
USPC ................................................. 705/7, 35–45  
See application file for complete search history.

(56) References Cited

U.S. PATENT DOCUMENTS

| 4,887,206 | A | 12/1989 | Natarajan |
| 5,006,998 | A | 4/1991 | Yasunobu et al. |
| 5,276,775 | A | 1/1994 | Meng |
| 5,680,305 | A | 10/1997 | Apgar, IV |
| 5,724,262 | A | 3/1998 | Ghahramani |
| 5,745,880 | A | 4/1998 | Strothmann |
| 5,793,632 | A | 8/1998 | Fad et al. |
| 5,960,417 | A | 9/1999 | Pan et al. |
| 5,963,939 | A | 10/1999 | McCann et al. |
| 6,004,015 | A | 12/1999 | Watanabe et al. |
| 6,249,769 | B1 * | 6/2001 | Ruffin et al. ................. 705/7.13 |
| 7,376,579 | B2 * | 5/2008 | Hack et al. ................... 705/7.36 |

(Continued)

FOREIGN PATENT DOCUMENTS

| JP | 11184785 | 7/1999 |
| JP | 2003187134 A | 7/2003 |

(Continued)

OTHER PUBLICATIONS

Reijers, H.A. et al., Best Practices in Business Process Redesign: An Overview and Qualitative Evaluation of Successful Redesign Heuristics, The International Journal of Management, Omega, vol. 33, 2005.*

(Continued)

*Primary Examiner* — Robert Niquette  
(74) *Attorney, Agent, or Firm* — Lisa Ulrich; Hoffman Warnick LLC

(57) ABSTRACT

The present invention relates to a computer-implemented method, system, and program product for identifying business offerings based on customer needs. In a typical embodiment, the present invention is implemented in conjunction with a spreadsheet computer program such as LOTUS 1-2-3, MICROSOFT EXCEL or the like. In any event, under the present invention, at least one initial analysis/customer detail will be designated. Based on the designation(s), a set of customer needs will be identified from a set of possible customer needs. Thereafter, at least one customer need from the set of customer needs will be designated. Based on this designation and a mapping of customer needs to possible business offerings, a set of prioritized business offerings will be identified from a set of possible business offerings.

16 Claims, 14 Drawing Sheets

(56) References Cited

U.S. PATENT DOCUMENTS

| | | | |
|---|---|---|---|
| 7,386,483 B1* | 6/2008 | Lee et al. | 705/26 |
| 2002/0040352 A1* | 4/2002 | McCormick | 705/80 |
| 2003/0046204 A1* | 3/2003 | Chik | 705/35 |
| 2003/0167198 A1* | 9/2003 | Northcott et al. | 705/10 |
| 2004/0143513 A1* | 7/2004 | Aleles et al. | 705/26 |
| 2005/0055299 A1* | 3/2005 | Chambers et al. | 705/36 |
| 2005/0080635 A1* | 4/2005 | Groff et al. | 705/1 |
| 2006/0245580 A1* | 11/2006 | Hein et al. | 379/265.12 |
| 2007/0145114 A1* | 6/2007 | Militello et al. | 235/379 |
| 2007/0162371 A1* | 7/2007 | Delf, Jr. | 705/35 |

FOREIGN PATENT DOCUMENTS

| | | |
|---|---|---|
| JP | 2004208278 A | 7/2004 |
| JP | 2004259210 A | 9/2004 |
| WO | 2005045725 A2 | 5/2005 |
| WO | WO 2005045725 * | 5/2005 |

OTHER PUBLICATIONS

E. Satoh, Information Materials for IDS, JPO Office Action Dated Jul. 5, 2011, 3 pages.

* cited by examiner

| Component Name | Current Priority | Override | Infrastructure Analysis | Industry Analysis | CBM-BoIT Analysis Insource | CBM-BoIT Analysis Outsource | Related Key Opportunities/Actions For |
|---|---|---|---|---|---|---|---|
| Value Theme / Other Solutions / Industry Solutions Service Area / Solution Area / Industry Service or Solution Name | | | | | | | Address high availability and scalability requirements |
| Networking for Consumer Products | | | | | | | |
| Travel and Transportation | | | | | | | |
| Total Property Support for Travel and | | | | | | | |
| Asset Tracking and Management for Tr | | | | | | | |
| Business Continuity and Resilience for | | | | | | | |
| Self Service for Hospitality and Airlines | | | | | | | |
| Data Optimization and Network Support | | | | | | | |
| Service Center Support | | | | | | | |
| Retail | | | | | | | |
| Total Store Support Solution | High | | High | | | | |
| Store Infrastructure Consulting | High | | High | | | | |
| Store Implementation Services | High | | High | | | | |
| Store Support Desk | | | | | | | |
| Store Network Management | High | | | High | | | |
| Store Availability and Resiliency | | | | | | | |
| Store Availability and Resiliency- Store Stability Consulting | | | | | | | |
| In-Store Telephony Solution | | | | | | | |
| Personal Shopping Assistant Solution | | | | | | | |
| Bottom of the Basket Solution | | | | | | | |
| Payment Acceptance Solutions | | | | | | | |
| Enhance Business Resilience and Security | | | | | | | |

Dropdown (304):
- Distribution Sector
- on demand Infrastructure
- Business Resilience
- Operational Efficiency
- Technology Adoption
- Other Services
- Industry Solutions
- Communications Sector
- Distribution Sector
- Financial Services Sector
- Industrial Sector
- Public Sector
- Infrastructure Solutions
- Hardware
- Software Buttons: Help, Back, Search, Show/Hide Details (308), Show Prioritized Offerings, Return to Start Opportunity Assessment Guide (300, 302, 306)

Tabs: START / Solution Needs / Infrastructure Analysis / Prioritized Offerings / Offering List / Dashboard

FIG. 11

COMPUTER-IMPLEMENTED METHOD, SYSTEM, AND PROGRAM PRODUCT FOR IDENTIFYING BUSINESS OFFERINGS BASED ON CUSTOMER NEEDS

FIELD OF THE INVENTION

In general, the present invention relates to business opportunity assessment. Specifically, the present invention relates to a computer-implemented method, system, and program product for identifying business offerings based on customer needs.

BACKGROUND OF THE INVENTION

As Information Technology (IT) continues to advance, businesses/customers are presented with increasing number of offerings for products and other solutions to fit their various needs. Along these lines, service providers attempt to identify various offerings they may have to address customers' needs. For example, if a customer desires higher network security, a service provider may have several possible offerings that could possibly address this need. However, identifying which of the possible offerings best fits the customer's need can be a challenge. This is especially the case given that the universe of possible offerings can steadily increase over time. It can also be a challenge given that two different customers may have similar needs, but could benefit by different offerings.

Heretofore, attempts have been made at identifying business offerings. Unfortunately, such previous approaches fail to provide a fully evaluative and analytical system. Among other things, such previous approaches fail to: (1) provide a true assessment of customer needs; (2) analytically link/map business offerings to selected customer needs; (3) rank/prioritize business offerings based on specific customer situations; etc.

In view of the foregoing, there exists a need for an approach that overcomes one or more of the deficiencies in the existing art.

SUMMARY OF THE INVENTION

In general, the present invention relates to a computer-implemented method, system, and program product for identifying business offerings based on customer needs. In one embodiment, the present invention is implemented in conjunction with a spreadsheet computer program such as IBM's LOTUS 1-2-3, MICROSOFT EXCEL or the like. In any event, under the present invention, analysis detail(s) initially will be (electronically) designated. For example, a view that relates to a particular business analysis perspective can be selected, and a particular business industry of the customer can be selected. Based on the selection(s), a set of customer needs will be identified from a set of possible customer needs. Thereafter, at least one customer need from the set of customer needs will be designated (e.g., selected and/or "focused" upon). Based on this designation and a mapping of customer needs to possible business offerings, a set of prioritized business offerings will be identified.

As indicated above, the present invention is typically implemented in conjunction with a spreadsheet computer program. To this extent, the set of customer needs can be displayed in a hierarchy of rows of a spreadsheet page in which selection of a parent customer need in the hierarchy can automatically result in a selection of any corresponding child customer needs in the hierarchy. In addition, the set of prioritized business offerings can be displayed in rows of another spreadsheet page, while the set of possible business offerings can be displayed in rows of yet another spreadsheet page.

Still yet, the mapping links (numerically and/or textually) the customer needs to the possible business offerings (e.g., based on the at least one customer need that is selected), and can be provided as a matrix in a fourth spreadsheet page. Along these lines, the mapping is based on a rating of the at least one customer need, an affinity of the at least one customer need to the possible business offerings, and a quantity of hits to a possible business offering for a specific customer need at a particular rating level.

A first aspect of the present invention provides a computer-implemented method for identifying business offerings based on customer needs, comprising: receiving a designation of at least one detail; identifying a set of customer needs from a set of possible customer needs based on the at least one detail; receiving a designation of at least one customer need from the set of customer needs; and identifying a set of prioritized business offerings from a set of possible business offerings based on the at least one customer need and a mapping of customer needs to possible business offerings.

A second aspect of the present invention provides a system for identifying business offerings based on customer needs, comprising: a detail selection system for receiving a selection of a view that relates to a particular business analysis perspective; a customer needs identification system for identifying a set of customer needs from a set of possible customer needs based on the view; a customer needs selection system for receiving a designation of at least one customer need from the set of customer needs; and a prioritized offering system for identifying a set of prioritized business offerings from a set of possible business offerings based on the at least one customer need and a mapping of customer needs to possible business offerings.

A third aspect of the present invention provides a program product stored on a computer readable medium for identifying business offerings based on customer needs, the computer readable medium comprising program code for causing a computer system to perform the following steps: receiving a designation of at least one detail; identifying a set of customer needs from a set of possible customer needs based on the at least one detail; receiving a designation of at least one customer need from the set of customer needs; and identifying a set of prioritized business offerings from a set of possible business offerings based on the at least one customer need and a mapping of customer needs to possible business offerings.

A fourth aspect of the present invention provides a method for deploying an application for identifying business offerings based on customer needs, comprising: providing a computer infrastructure being operable to: receive a selection of a view that relates to a particular business analysis perspective; identify a set of customer needs from a set of possible customer needs based on the view; receive a designation of at least one customer need from the set of customer needs; and identify a set of prioritized business offerings from a set of possible business offerings based on the at least one customer need and a mapping of customer needs to possible business offerings.

In view of the foregoing, there exists a need for a computer-implemented method, system, and program product for identifying business offerings based on customer needs.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIG. 3 depicts a screenshot of customer needs according to the present invention.

FIG. 10 depicts a screenshot of possible business offerings according to the present invention.

FIG. 11 depicts a mapping of possible business offerings to customer needs according to the present invention.

It is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

Figure 1A:
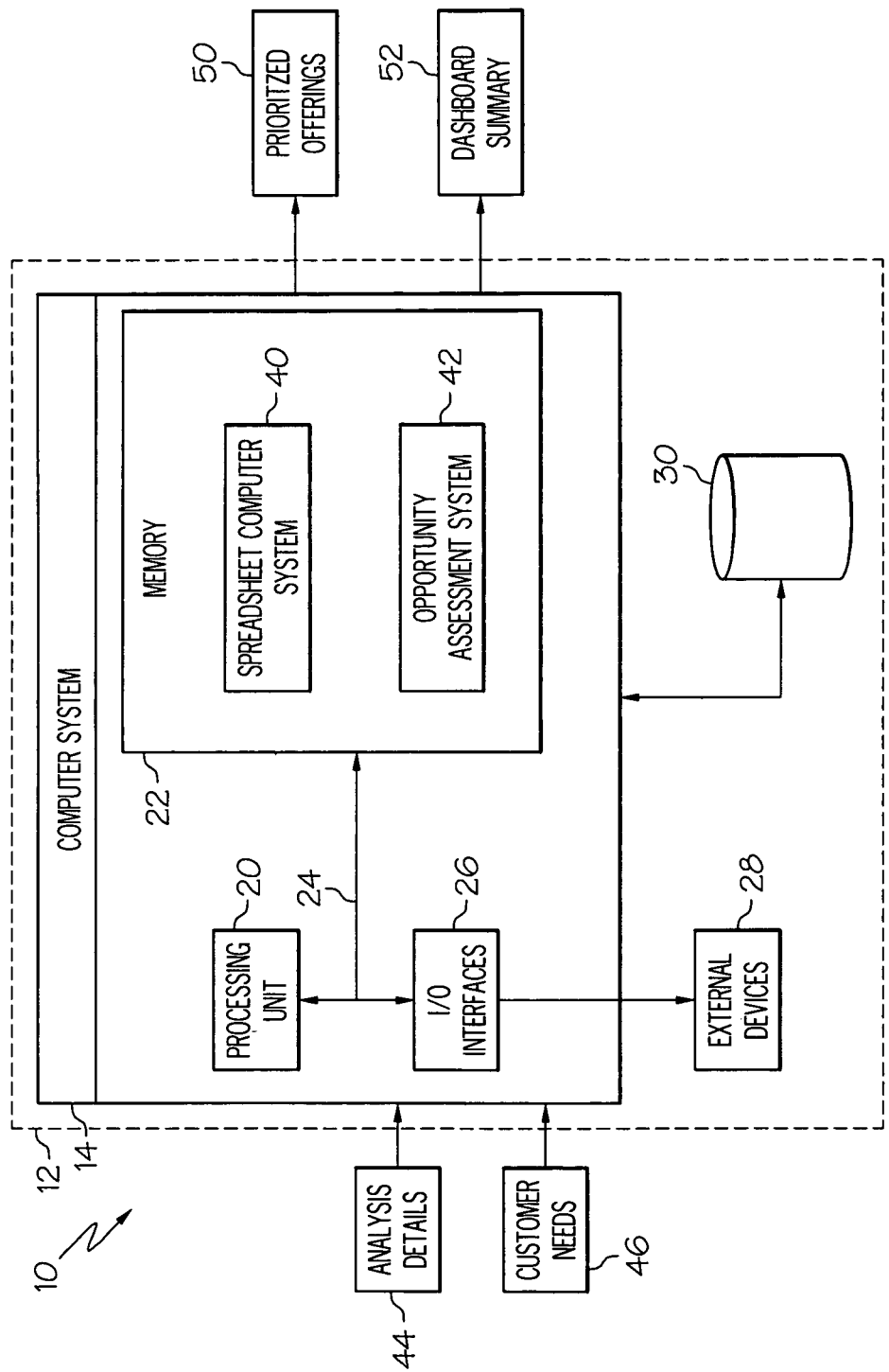
FIG. 1A depicts a system for identifying business offerings based on customer needs according to the present invention.

For convenience purposes, the Best Mode for Carrying Out the Invention has the following sections.
I. General Description
II. Computerized Implementation
 A. Customer Needs
 B. Business Offerings
  1. Mapping
 C. Dashboard Overview
I. General Description As indicated above, the present invention relates to a computer-implemented method, system, and program product for identifying business offerings based on customer needs. In a typical embodiment, the present invention is implemented in conjunction with a spreadsheet computer program such as IBM'S LOTUS 1-2-3, MICROSOFT EXCEL or the like. In any event, under the present invention, analysis detail(s) initially will be (electronically) designated. For example, a view that relates to a particular business analysis perspective can be selected, and a particular business industry of the customer can be selected. Based on the selection(s), a set of customer needs will be identified. Thereafter, at least one customer need from the set of customer needs will be designated (e.g., selected and/or "focused" upon). Based on this designation and a mapping of customer needs to possible business offerings, a set of prioritized business offerings will be identified.

As indicated above, the present invention is typically implemented in conjunction with a spreadsheet computer program. To this extent, the set of customer needs can be displayed in a hierarchy of rows of a spreadsheet page in which selection of a parent customer need in the hierarchy can automatically result in a selection of any corresponding child customer needs in the hierarchy. In addition, the set of prioritized business offerings can be displayed in rows of another spreadsheet page, while the set of possible business offerings can be displayed in rows of yet another spreadsheet page.

Still yet, the mapping links (numerically and/or textually) the customer needs to the possible business offerings (e.g., based on the at least one customer need that is selected), and can be provided as a matrix in a fourth spreadsheet page. Along these lines, the mapping is based on a rating of the at least one customer need, an affinity of the at least one customer need to the possible business offerings, and a quantity of hits to a possible business offering for a specific customer need at a particular rating level.

These concepts will be depicted and described in greater detail in Section II below in conjunction with FIGS. 1A-13.
II. Computerized Implementation Referring now to FIG. 1A, a system 10 for identifying business offerings based on customer needs according to the present invention is shown. As depicted, system 10 includes a computer system 14 deployed within a computer infrastructure 12. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets based protocol, and an Internet service provider could be used to establish connectivity to the Internet. Still yet, computer infrastructure 12 is intended to demonstrate that some or all of the components of system 10 could be deployed, managed, serviced, etc. by a service provider who offers to identify business offerings based on customer needs.

As shown, computer system 14 includes a processing unit 20, a memory 22, a bus 24, and input/output (I/O) interfaces 26. Further, computer system 14 is shown in communication with external I/O devices/resources 28 and storage system 30. In general, processing unit 20 executes computer program code, such as spreadsheet computer program 40 and opportunity assessment system 42, which are stored in memory 22 and/or storage system 30. While executing computer program code, processing unit 20 can read and/or write data to/from memory 22, storage system 30, and/or I/O interfaces 26. Bus 24 provides a communication link between each of the components in computer system 14. External devices 28 can comprise any devices (e.g., keyboard, pointing device, display, etc.) that enable a user to interact with computer system 14 and/or any devices (e.g., network card, modem, etc.) that enable computer system 14 to communicate with one or more other computing devices.

Computer infrastructure 12 is only illustrative of various types of computer infrastructures for implementing the invention. For example, in one embodiment, computer infrastructure 12 comprises two or more computing devices (e.g., a server cluster) that communicate over a network to perform the various process steps of the invention. Moreover, computer system 14 is only representative of various possible computer systems that can include numerous combinations of hardware. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interfaces 26 can comprise any system for exchanging information with one or more external devices 28.

Still further, it is understood that one or more additional components (e.g., system software, math co-processing unit, etc.) not shown in FIG. 1A can be included in computer system 14. However, if computer system 14 comprises a handheld device or the like, it is understood that one or more external devices 28 (e.g., a display) and/or storage system(s) 30 could be contained within computer system 14, not externally as shown.

Storage system 30 can be any type of system (e.g., a database) capable of providing storage for information under the present invention, such a customer analyses, customer needs, client interviews, business offerings, customer needs to business offerings mappings, details of customer needs/business offerings, etc. To this extent, storage system 30 could include one or more storage devices, such as a magnetic disk drive or an optical disk drive. In another embodiment, storage system 30 includes data distributed across, for example, a local area network (LAN), wide area network (WAN) or a storage area network (SAN) (not shown). Although not shown, additional components, such as cache memory, communication systems, system software, etc., may be incorporated into computer system 14.

Shown in memory 22 of computer system 14 is opportunity assessment system 42, which is implemented in conjunction with spreadsheet computer program 40 (e.g., LOTUS 1-2-3, MICROSOFT EXCEL, etc.). These systems will provide the functionality of the present invention. It should be understood, that although shown as separate programs, spreadsheet computer program 40 and opportunity assessment system 42 could be implemented as a single program within the meaning of the phrase "in conjunction with". As will be further described below, opportunity assessment system 42 can receive input such as (but not limited to) initial analysis details 44, and needs 46 of the customer. Such input will be processed and output such as prioritized offerings 50 and a dashboard summary 52 will be provided.

Figure 1B:
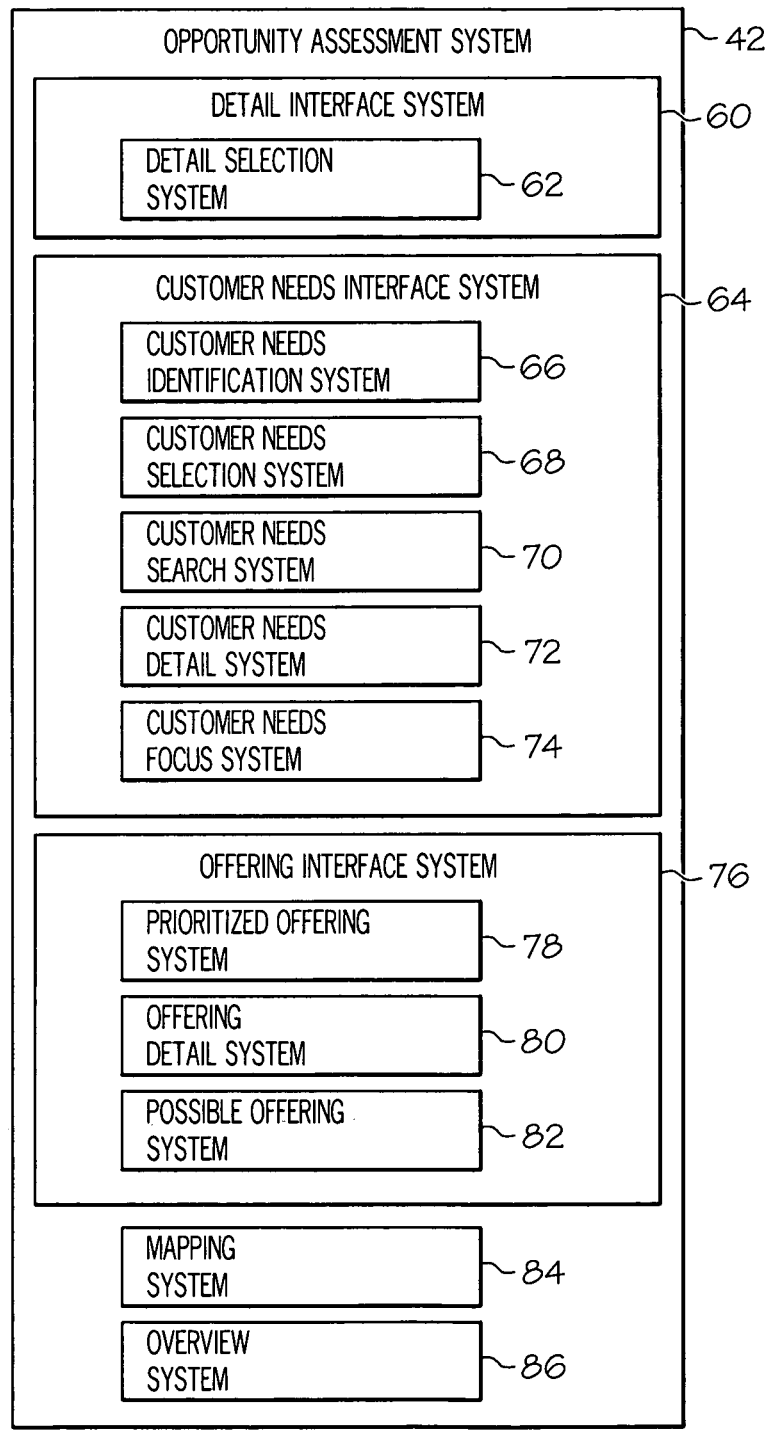
FIG. 1B depicts the opportunity assessment system of FIG. 1A in greater detail.

Referring now to FIG. 1B, opportunity assessment system 42 is shown in greater detail. Before the systems shown in FIG. 1B are described in greater detail, it should be understood in advance that the functionality of the present invention could be implemented with a different configuration of systems than shown. The depiction shown in FIG. 1B is given only to provide a single illustrative embodiment. As such, all possible systems may not have been shown in FIG. 1B. In any event, opportunity assessment system 42 works in conjunction with spreadsheet computer program 40 (FIG. 1A) to provide various spreadsheet pages, perform computations, and provide all functionality of the present invention.

A. Customer Needs

Figure 2:
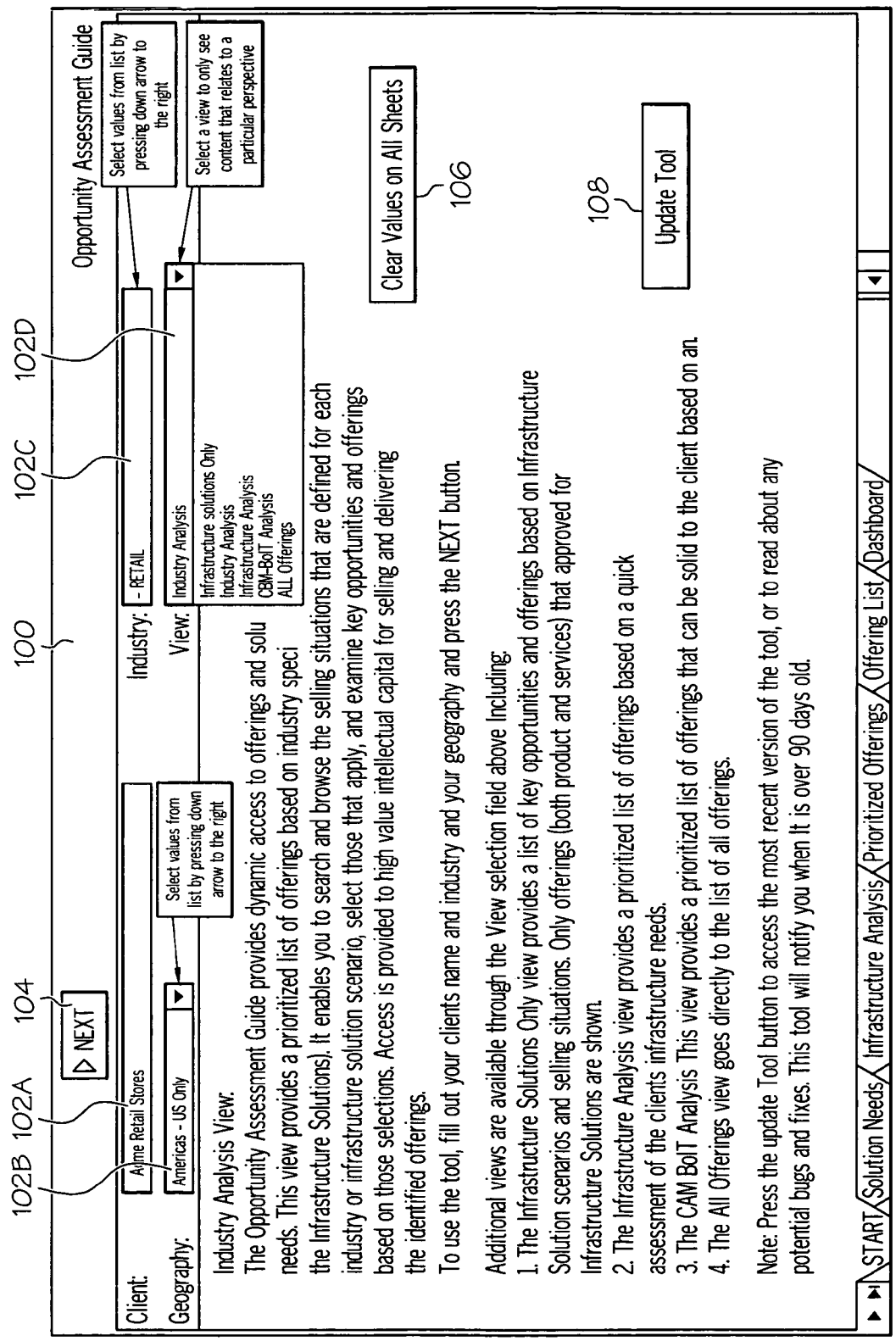
FIG. 2 depicts a screenshot for designating initial analysis details according to the present invention.

As shown, opportunity assessment system 42 includes a detail interface system 60, which itself includes a detail selection system 62. In general, detail interface system 60 provides a spreadsheet page in which initial customer/analysis details can be selected or otherwise designated, and receives any such selections/designations. Referring to FIG. 2, an illustrative detail spreadsheet page 100 as provided by detail interface system 60 (FIG. 1B) is shown. As depicted, detail spreadsheet page 100 includes a mechanism 102A for selecting/designating a customer/client's name, a mechanism 102B for selecting/designating a customer's geography, a mechanism 102C for selecting/designating a business industry of the customer, and a mechanism 102D for selecting/designating a view that relates to a particular business analysis perspective for the customer. It should be understood that some of these selections could be optional. For example, a specific business industry of the customer need not be selected. However, in a typical embodiment, at least a view will be selected via mechanism 102D.

In any event, detail spreadsheet page 100 also includes a clearance button 106 and an update button 108. Clearance button 106 generally clears all values on all spreadsheet pages, while update button 108 allows updates to opportunity assessment system 40 to be obtained. When one or more customer details have been selected/designated by a user via mechanisms 102A-D, next button 104 can be activated and detail selection system 62 will receive/note the selection(s).

Figure 3:
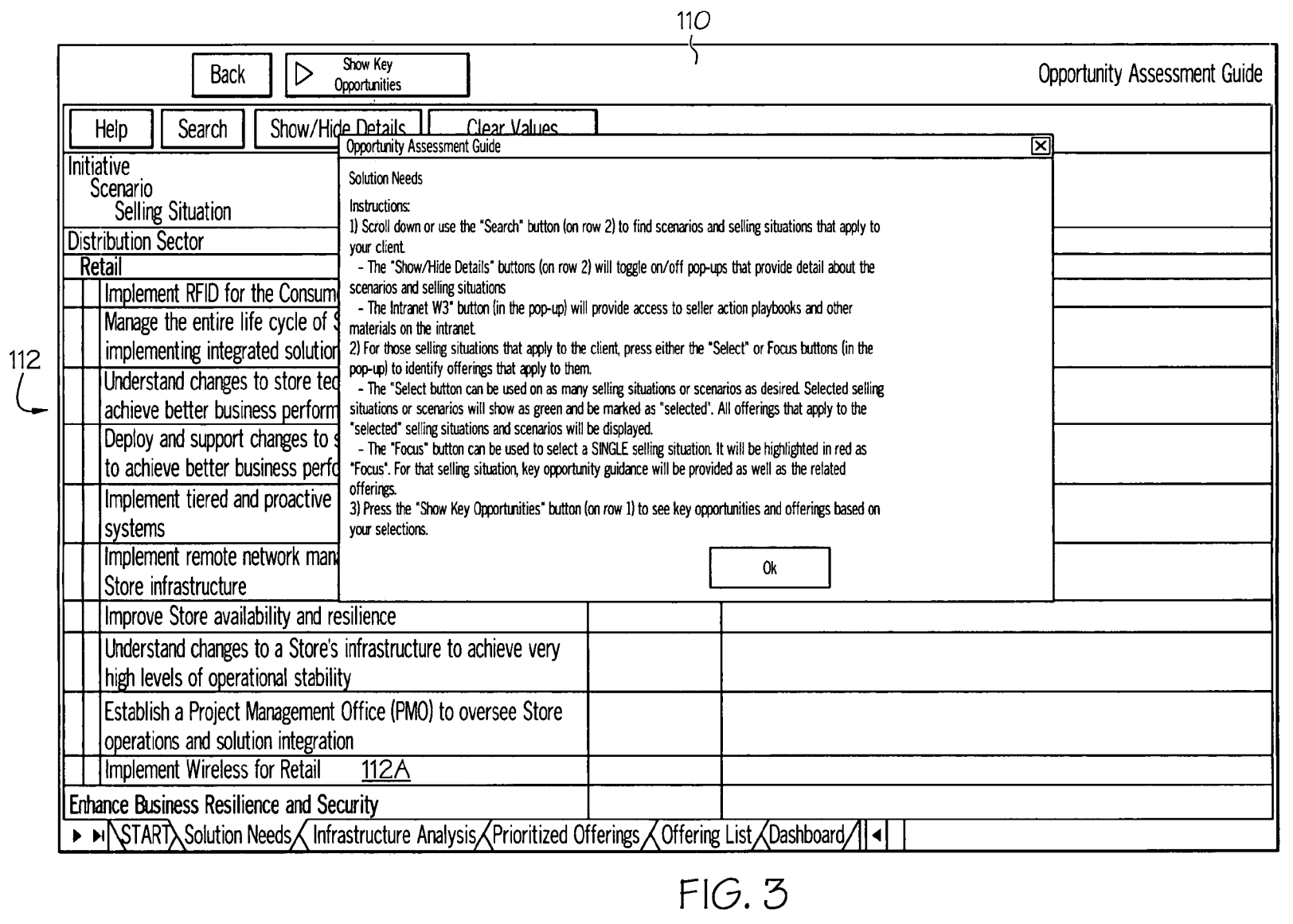

Based on the selection(s) (e.g., the view, business industry, etc. selected in FIG. 2) customer needs identification system 66 of customer needs interface system 64 will identify a set of customer needs from a set of possible customer needs, and display the identified set of customer needs in a customer needs spreadsheet page for the user. Referring to FIG. 3, an illustrative customer needs spreadsheet page 110 is shown. As depicted, customer needs spreadsheet page 110 contains a set of customer needs 112 that can be individually designated (e.g., selected and/or "focused" upon). For example, customer need 112A states "Implement Wireless for Retail". If this customer need 112A is selected, it would mean that implementing wireless infrastructure for its retail operation was a need of the customer. In general, set of customer needs 112 are identified based on the selections made using FIG. 2. That is, a different set of customer needs could be identified and displayed in FIG. 3 if one or more of the designations of FIG. 2 changed. In addition, referring briefly to FIG. 6, the set of needs are typically displayed in a hierarchy 114 of rows within customer needs spreadsheet page 110. For example, the customer need "Compliance with Unfunded Mandates" is a child of "Protect IT Infrastructure from Threats". To this extent, as will be further described below, a selection of a parent customer need in hierarchy 114 can automatically result in a selection of any corresponding child customer needs.

Figure 4:
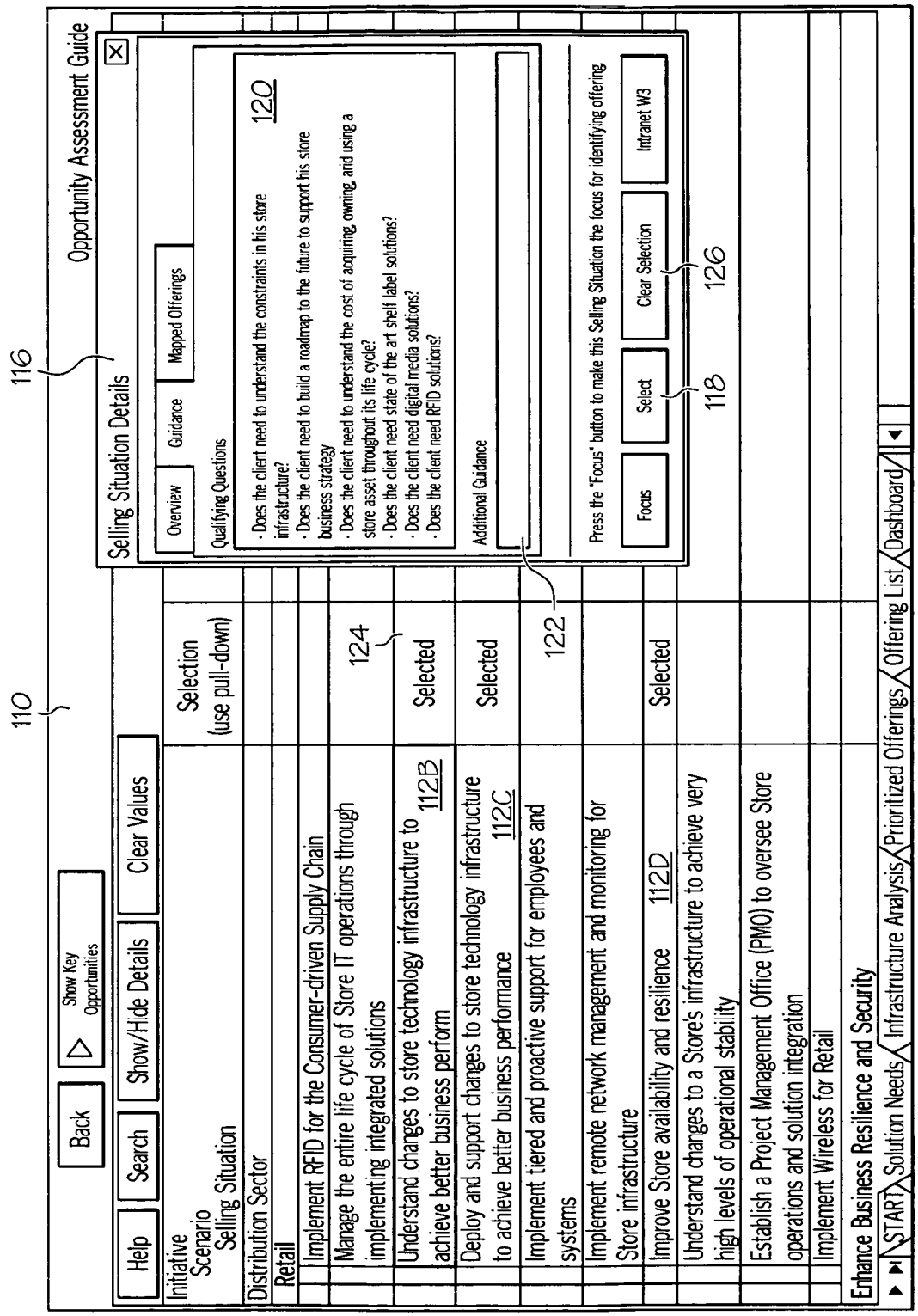
FIG. 4 depicts a screenshot of selecting customer needs according to the present invention.

Regardless, referring now to FIG. 4, the selection of at least one customer need will be illustrated. Specifically, when a particular customer need is interacted with (e.g., "clicked" with a pointer device such as a mouse by the user), customer needs dialog 116 will be displayed by customer needs interface system 64 (FIG. 1B). If select button 118 is activated, that customer need will officially be "selected" (as indicated by selection indicator 124). All such selection(s) 112B-D will be received/noted by customer needs selection system 68 of FIG. 1B, which will also post selection indicator 124 as shown. As mentioned above, if a parent customer need 112 is selected, any corresponding children customer needs 112 will also be automatically selected. If clear selection button 126 is activated, the corresponding selection will be cleared along with its associated selection indicator 124 (e.g., by/from customer needs selection system 68). As further shown in FIG. 4, customer needs dialog 116 can include qualifying questions 120 about the customer need selected, as well as a field 122 for requesting additional guidance.

Figure 5:
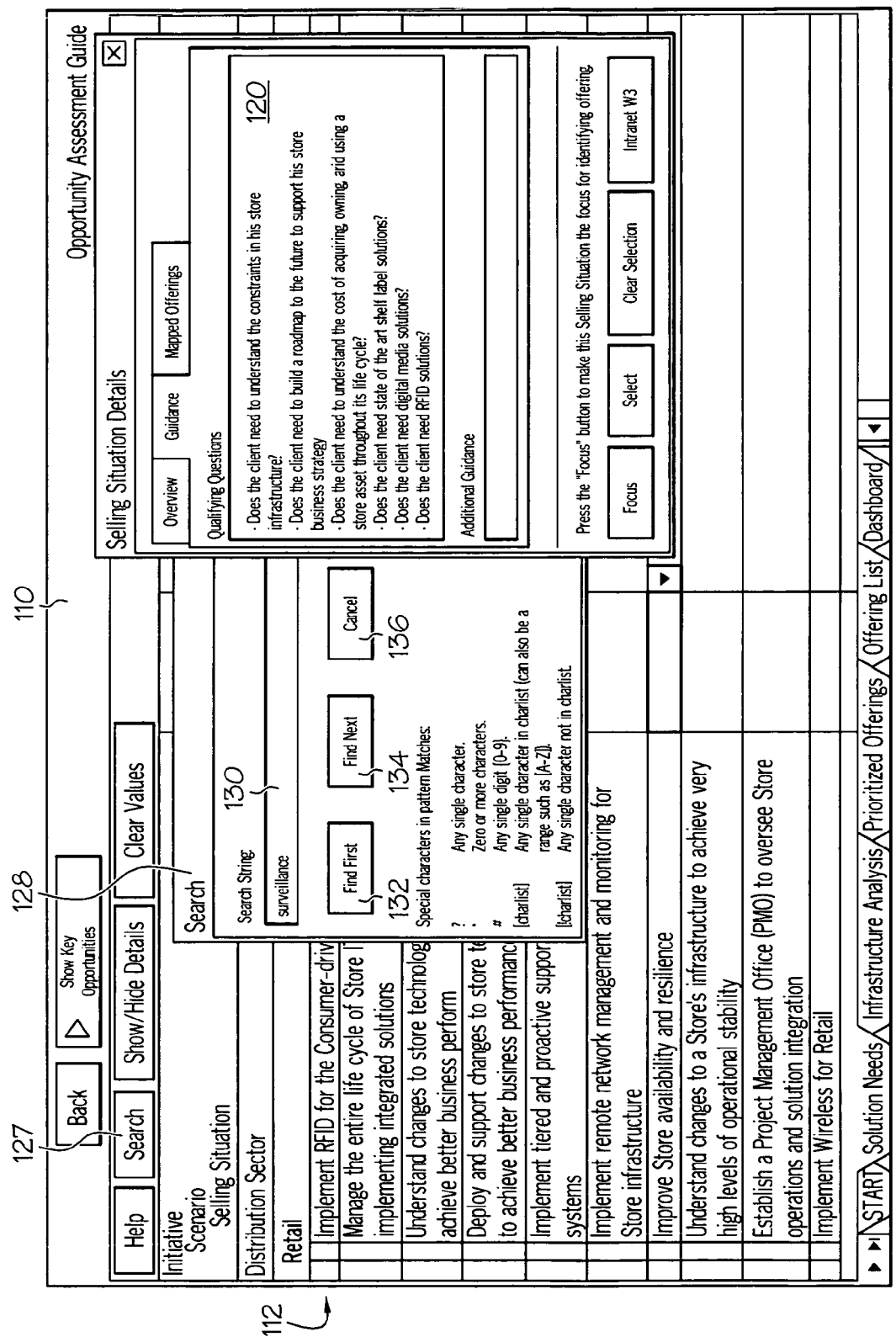
FIG. 5 depicts a screenshot of searching customer needs according to the present invention.

Referring now to FIG. 5, the present invention also provides the capability to search customer needs 112. Specifically, at any time in which customer needs spreadsheet page 110 is displayed, the user can activate search button 127. Upon doing so, customer needs search system 70 (FIG. 1B) will cause search dialog 128 to be displayed. The user can then input a search string into search field 130. The user can then activate first button 132 to cause customer needs search system 70 to find the first matching customer need, next button 134 to cause customer needs search system 70 to find a next matching customer need, or cancel button 136 to cause customer needs search system 70 to cancel the search operation.

Figure 6:
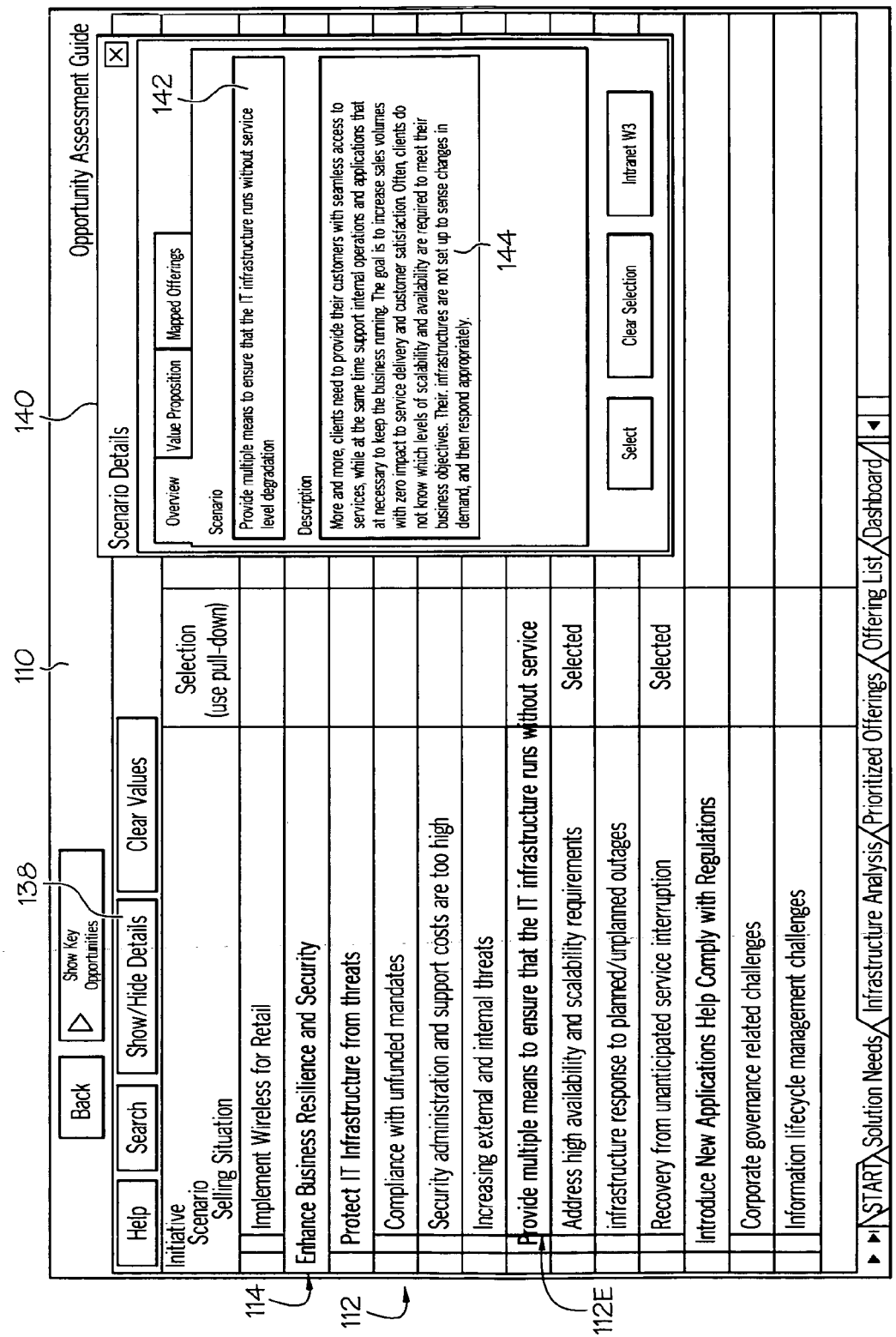
FIG. 6 depicts a screenshot that provides overview details of customer needs according to the present invention.

Referring to FIG. 6, it can be seen that the present invention can also provide addition details for customer needs 112. Specifically, when the user interacts with a specific customer need 112E, and activates details button 138, customer needs detail dialog 140 will be displayed by customer needs detail system 72 (FIG. 1B). As shown in FIG. 6, customer needs details dialog 140 includes a scenario 142 for the particular customer need 112E, as well as a corresponding description 144 of customer need 112E.

Figure 7:
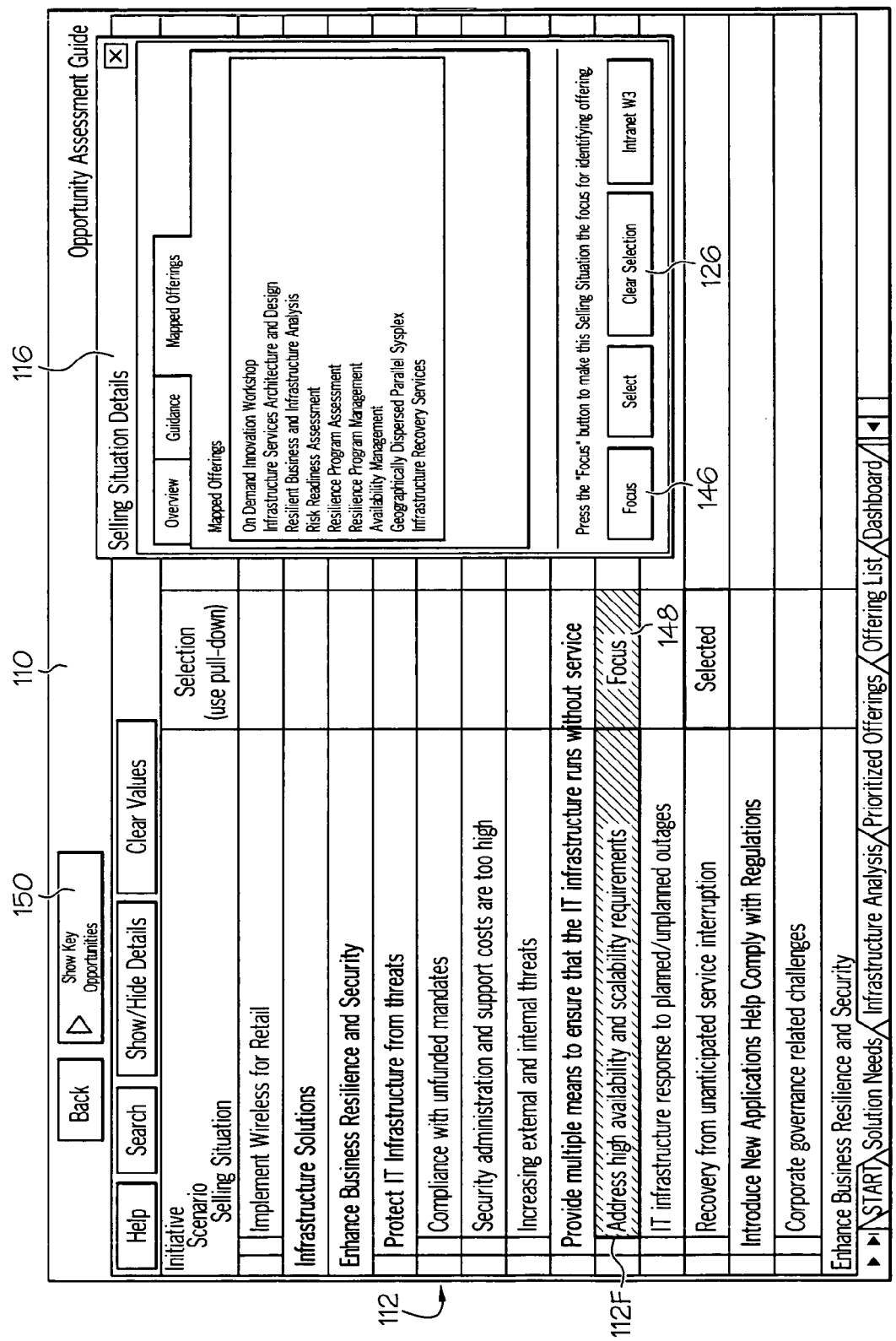
FIG. 7 depicts a screenshot of focusing customer needs according to the present invention.

Referring now to FIG. 7, the present invention also allows customer needs 112 to be "focused" upon. Focusing upon a customer need such as customer need 112F will result in a higher weighting or priority being given to that customer need 112F when applicable business offerings are being identified. In general, a customer need is "focused" upon when multiple customer needs are applicable. Customer need 112F can be "focused" upon using customer needs dialog 116 (originally depicted in FIG. 4). Specifically, when customer need 112F is interacted with and customer needs dialog 116 is displayed, the user can activate focus button 146, which would cause customer need 112F to be "focused" upon. This operation would be received/noted by customer needs focus system 74 (FIG. 1B), which would post focus indicator 148 as shown. If a customer need is "selected" while another is "focused" upon, the higher priority will be given to the customer need that is focused upon. To this extent, a "designation of at least one customer need" will mean either a selection of a customer need, a "focusing" upon of a customer need, and/or a combination thereof. However, if clear selection button 126 is activated, the corresponding focus operation will be cleared along with its associated focus indicator 148 (e.g., by/from customer needs selection system 68).

B. Offerings

Figure 8:
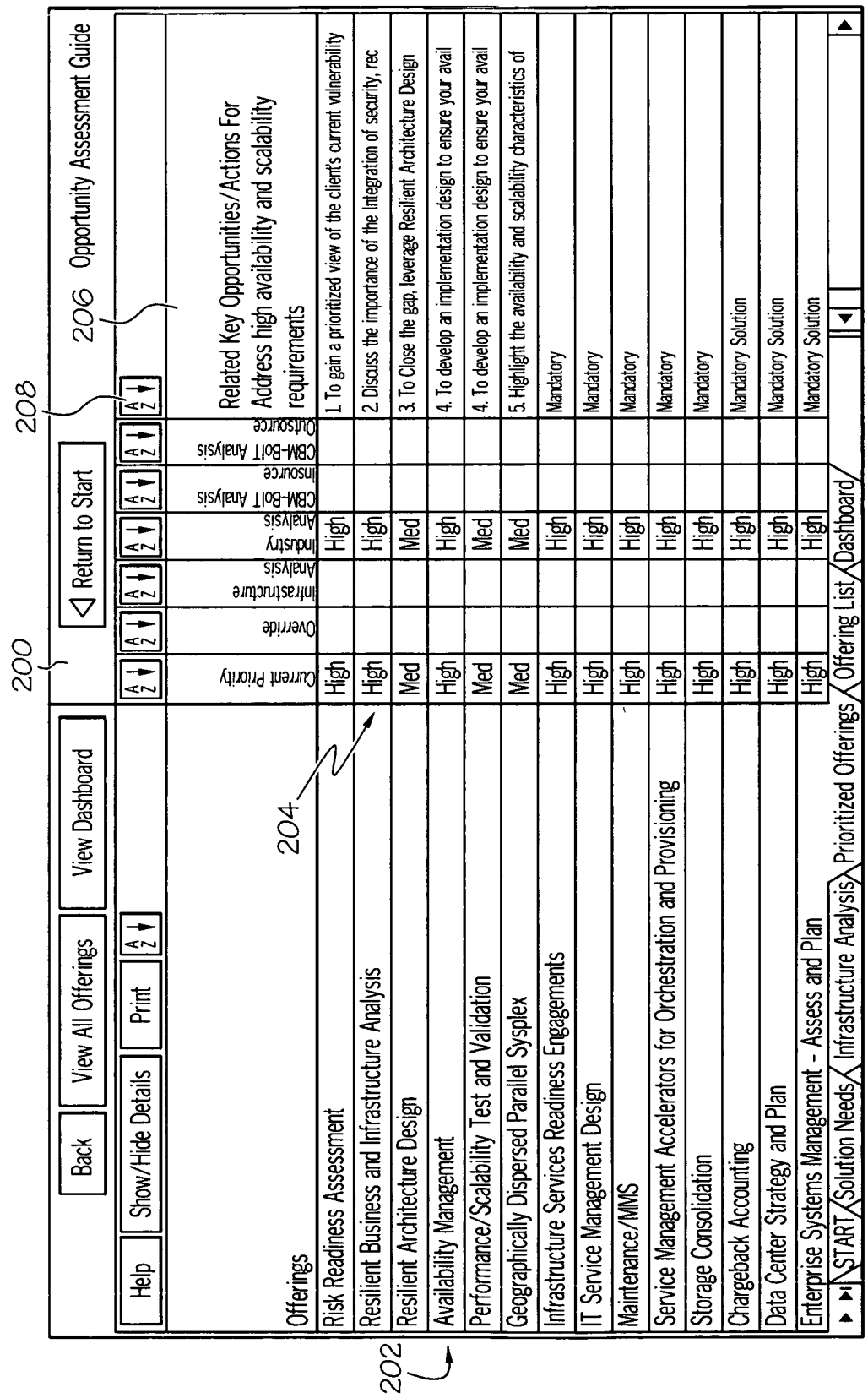
FIG. 8 depicts a screenshot of prioritized business offerings according to the present invention.

Once any desired selections and/or focuses have been made by the user, key opportunity button 150 can be activated. In response, prioritized offering system 78 (FIG. 1B) of offering interface system 76 (FIG. 1B) will identify a set of prioritized business offerings from a set of possible business offerings based on the customer need(s) selected and/or "focused" upon, as well as a mapping of customer needs 112 (FIGS. 4-7) to possible business offerings. Referring to FIG. 8, an illustrative, offering spreadsheet page 200 according to the present invention is shown. In general, offering spreadsheet page 200 displays a set of prioritized business offerings 202 in rows (similar to customer needs in customer needs spreadsheet page 110). Prioritized business offerings 202 are derived by prioritized offering system 78 from a greater body of possible business offerings. As indicated above, this is done based on the customer needs selected and/or "focused" upon and a mapping of customer needs to the possible business solutions (to be further described below). For example, if the customer need selected relates to providing improved network security, only business offerings related to improving network security should be identified and displayed.

In addition, business offerings 202 are prioritized under the present invention by prioritized offering system 78. For example, as can be seen, each business offering 202 in FIG. 8 has an assigned priority 204 (e.g., low, medium, high, etc.). This priority is designated by prioritized offering system 78 based on the selections or focusing performed as described above. For example, a business offering related to a customer need that was "focused" upon, will have a higher priority than will business offerings related to a customer need that was "selected". In addition, priorities 204 can be assigned based on a preceding customer analysis. For example, through interviews, etc. with customer, certain areas can be identified as having a higher priority than others. Business offerings can be prioritized taking this into consideration. In any event, FIG. 8 also includes opportunities fields 206 for listing key opportunities and actions for the particular selling situation. These notes can be used to assist in the sale of the corresponding business offering to the customer and/or as additional information for the user/sales person. Still yet, FIG. 8 includes various sort buttons 208, upon the activation of which can sort prioritized business offerings 202 by business offerings, priorities, solution notes, etc.

Figure 9:
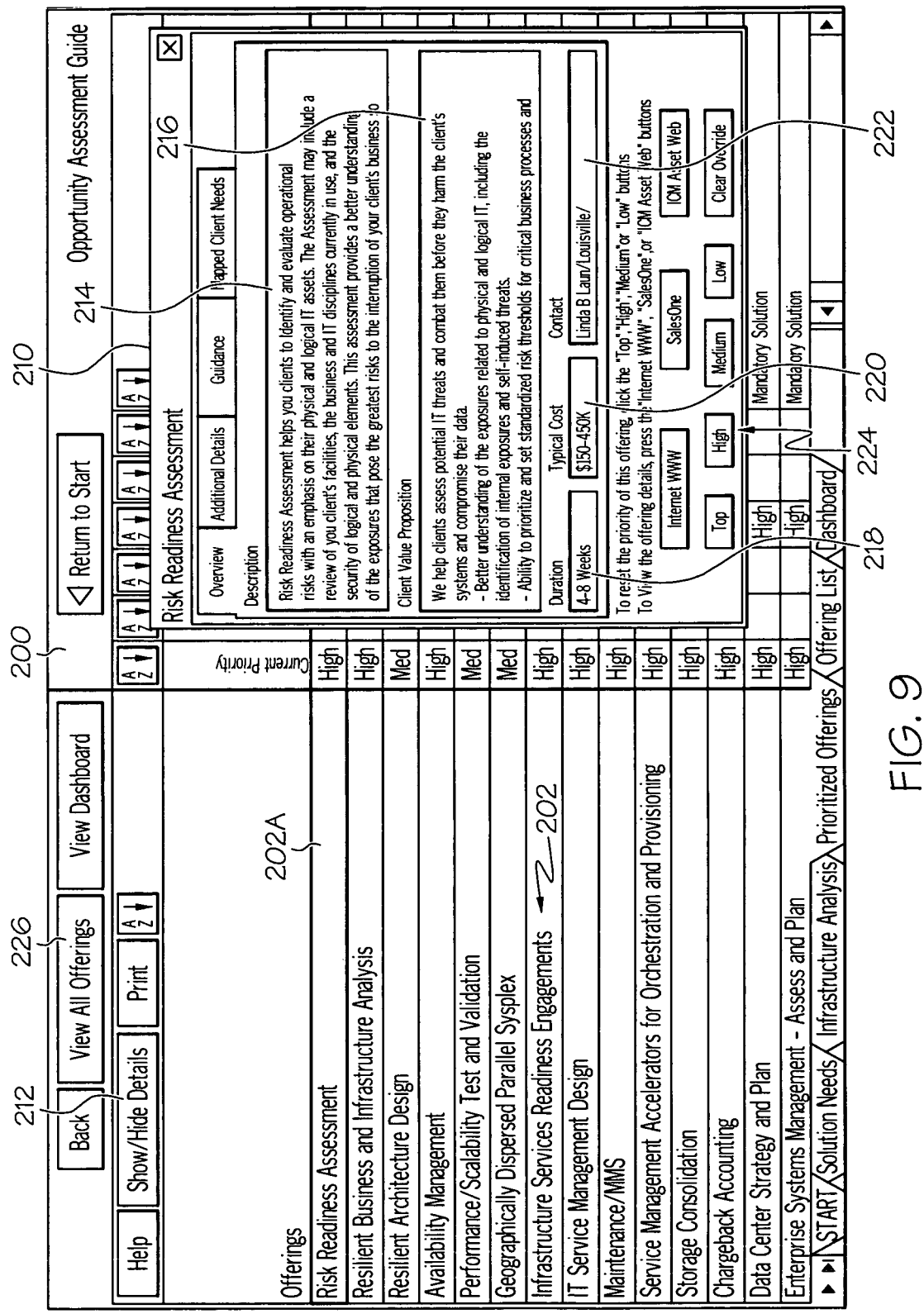
FIG. 9 depicts a screenshot providing overview details of prioritized business offerings according to the present invention.

Referring now to FIG. 9, it is shown that the present invention can also display an offering detail dialog 210 containing additional details of designated prioritized business offerings. Specifically, when the user interacts with a particular prioritized business offering 202A, and activates details button 212, offering dialog 210 will be displayed by offering detail system 80 (FIG. 1B). As shown, offering dialog 210 contains a description 214 of business offering 202A, a client value proposition 216 for business offering 202A, a duration 218 for implementing business offering 202A, a typical cost 220 of business offering 202A, and a sales and/or technical contact 222 for implementing business offering 202A for the customer. Offering dialog 210 can also include various buttons 224 for overriding (changing) a priority of business offering, or for clearing an overriding decision. Although not shown, data in offering detail dialog can include links to websites.

In any event, FIG. 9 also includes an all offering button 226. When activated, possible offering system 82 (FIG. 1B) will display a possible business offering spreadsheet page that contains all possible business offerings. Referring to FIG. 10, an illustrative possible business offering spreadsheet page 300 is depicted. In general, possible business offering spreadsheet page 300 will contain all possible business offerings 302 (from which prioritized business offerings 202 are identified). Possible business offering spreadsheet page 300 also includes a mechanism 304 for selecting a certain domain of possible business offerings 304. Selecting a certain domain will cause all possible business offerings in only that domain to be displayed. FIG. 10 further includes search button 306 and possible business offering detail button 308. Activation of search button will cause a search dialog to be displayed from which the user can search for a particular business offering 304 (similar to the way in which customer needs were searched in FIG. 5). This functionality could be provided by an offering search system (not shown in FIG. 1B). Activation of offering detail button 308 will cause a detail dialog to be displayed (e.g., by offering detail system 80 of FIG. 1B) containing additional information for a designated possible business offering 304 (similar to the additional details provided for customer needs 112 in FIG. 6 and/or prioritized business offerings 202 in FIG. 9).

1. Mapping

As indicated above, prioritized business offerings 202 (FIGS. 8-9) are identified based on customer needs 112 selected and/or "focused" upon in FIGS. 3-7, as well as a mapping of customer needs to possible business offerings 304 (FIG. 9). In a typical embodiment, the mapping is provided/computed by mapping system 84 (FIG. 1B) as a matrix in a spreadsheet page that links (e.g., numerically and/or textually) the customer needs to the possible business offerings.

Figure 11:
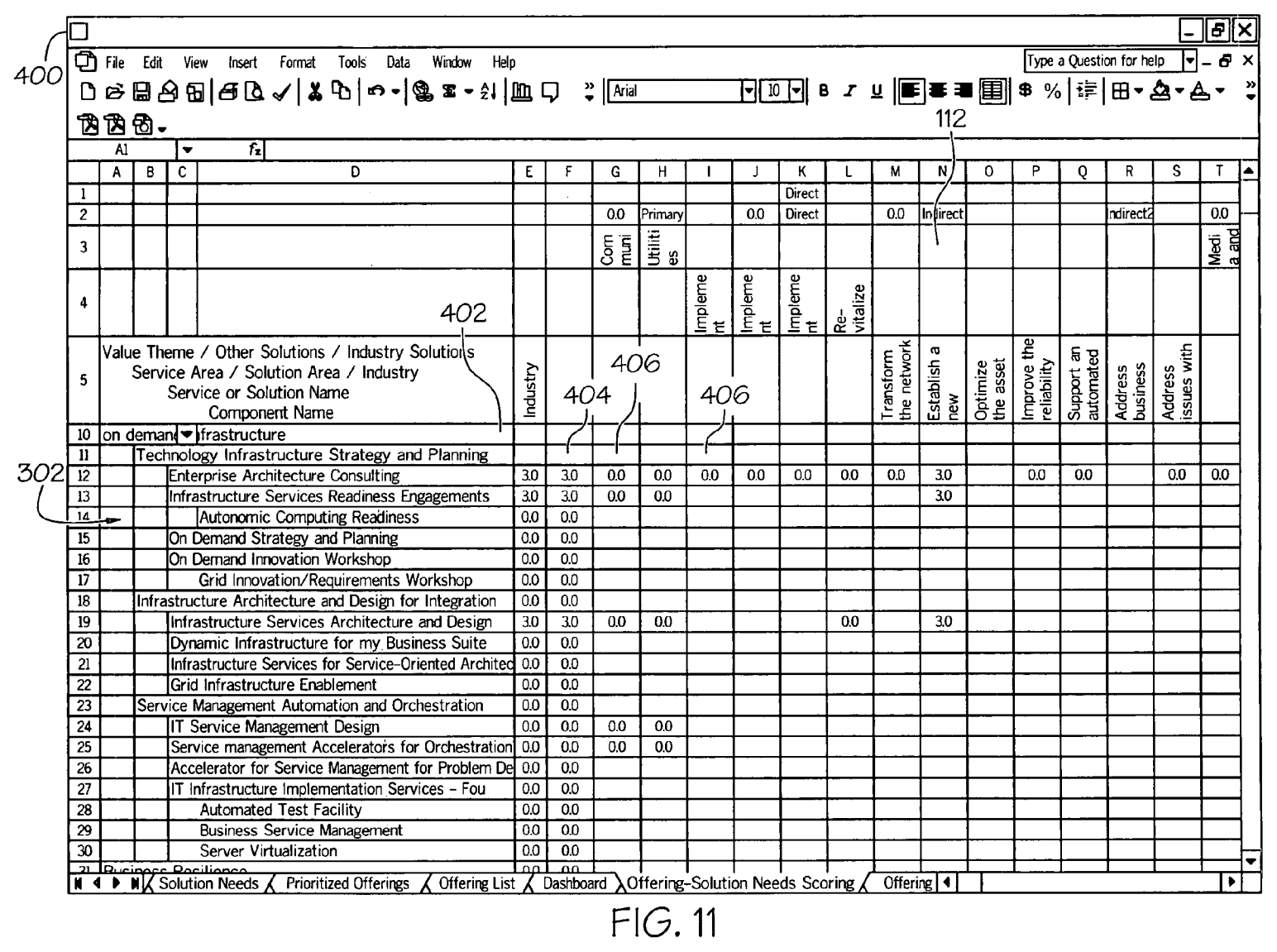

Referring to FIG. 11, an illustrative mapping spreadsheet page 400 is shown. In general, mapping spreadsheet page 400 comprises a column-row matrix 402 in which customer needs 112 are arranged in rows and possible business offerings 302 are arranged in columns. As can be seen, customer needs 112 have been numerically linked to possible business offerings 302 via numerical values 404. Formulas 406 in the cells calculate the priority based the settings from the customer needs 112. Color or other formatting techniques can be used on mapping spreadsheet page 400 to indicate different ratings for the connection.

In general, numerical values 404 (and hence the mapping) are computed by mapping system 84 based on a priority/rating of the at least one customer need, an affinity of the at least one customer need to the possible business offerings, and a quantity of hits to a possible business offering for a specific customer need at a particular priority/rating level. To this extent, numerical values 404 can change based on many factors such as the customer needs that are selected and/or "focused" upon, priority ratings of business offerings, etc.

Shown below is an algorithm that can be implemented by mapping system 84 in computing the mapping and hence identifying prioritized business offerings 202 (FIG. 8). Specifically, numerical values can be based on:

(1) highest rating level obtained; or
(2) prioritization groupings by rating level.

This is calculated by multiplying the user rating multiple by the affinity multiple, and adding together the number of hits for an option. The "multiples" are typically large enough to ensure that the summation process does not cross levels. For instance, a two level qualifier rating (primary/secondary) with a two level affinity multiple (High/Low) with fewer than ten possible selections might have the following formula:

If user_rating is Primary, set user_rating_value to 10000,
  Else if user_rating is Secondary, set user_rating value to 100
  Else set user_rating_value to 0
If affinity is High, set user_rating_value to 10,
  Else if affinity is Low, set affinity_value to 1
  Else set affinity_value to 0
Priority_factor for an option is summation across all qualifiers:
  user_rating*affinity_value The above formula would establish the following levels: Primary/High, Primary/Low, Secondary/High, Secondary/Low with the differentiation between the levels by number of hits. For those options prioritized, statements can be shown concerning the option/qualifier relationship to help the user understand the relationship.

Figure 12:
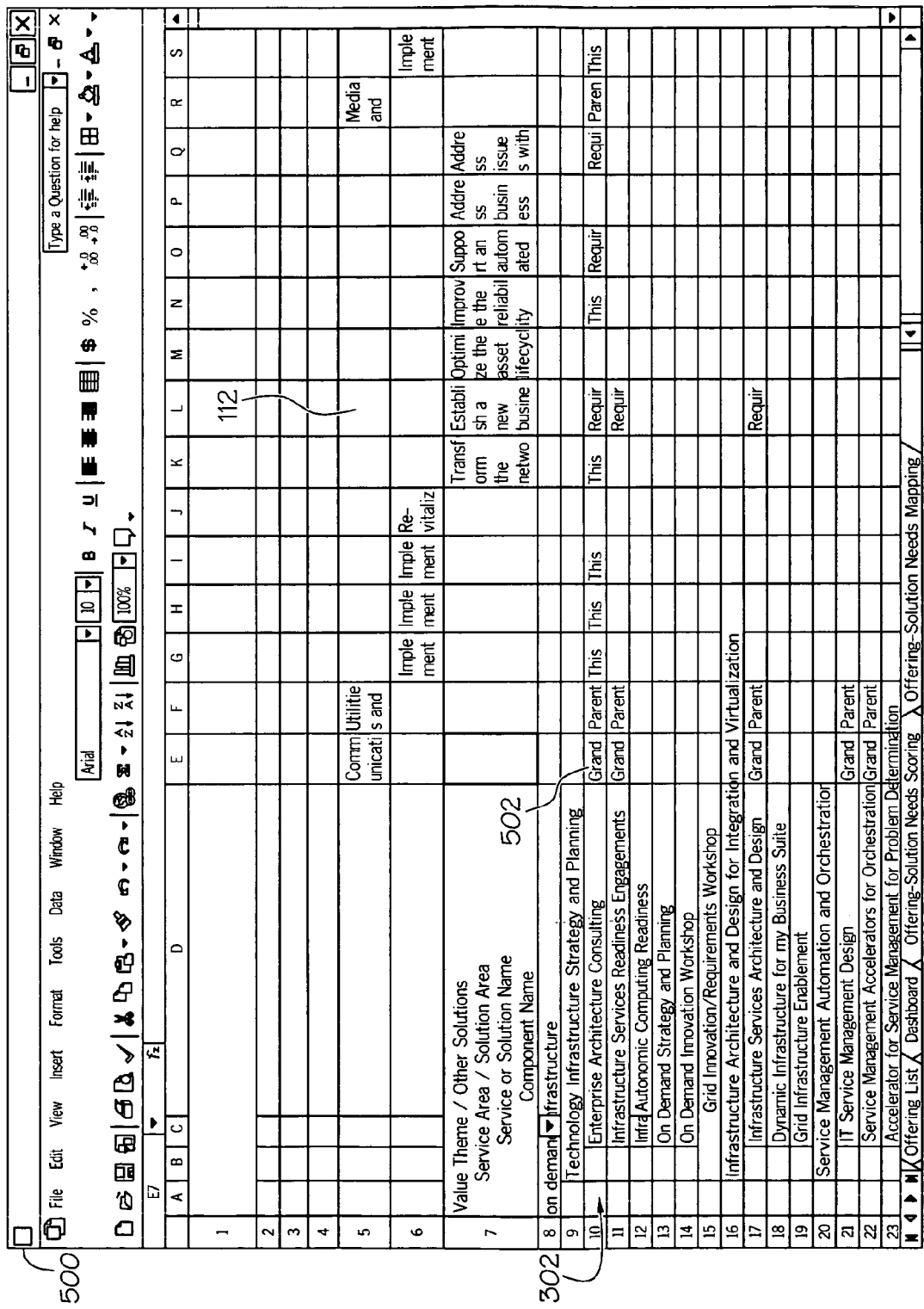
FIG. 12 shows an additional mapping spreadsheet according to the present invention.

FIG. 12 shows an additional mapping spreadsheet 500 that is used to provide the guidance 502 for why a particular customer need 112 is associated with a business offering 302. This statement is shown in the prioritized offerings spreadsheet as key opportunities and actions 206.

C. Dashboard Overview

Figure 13:
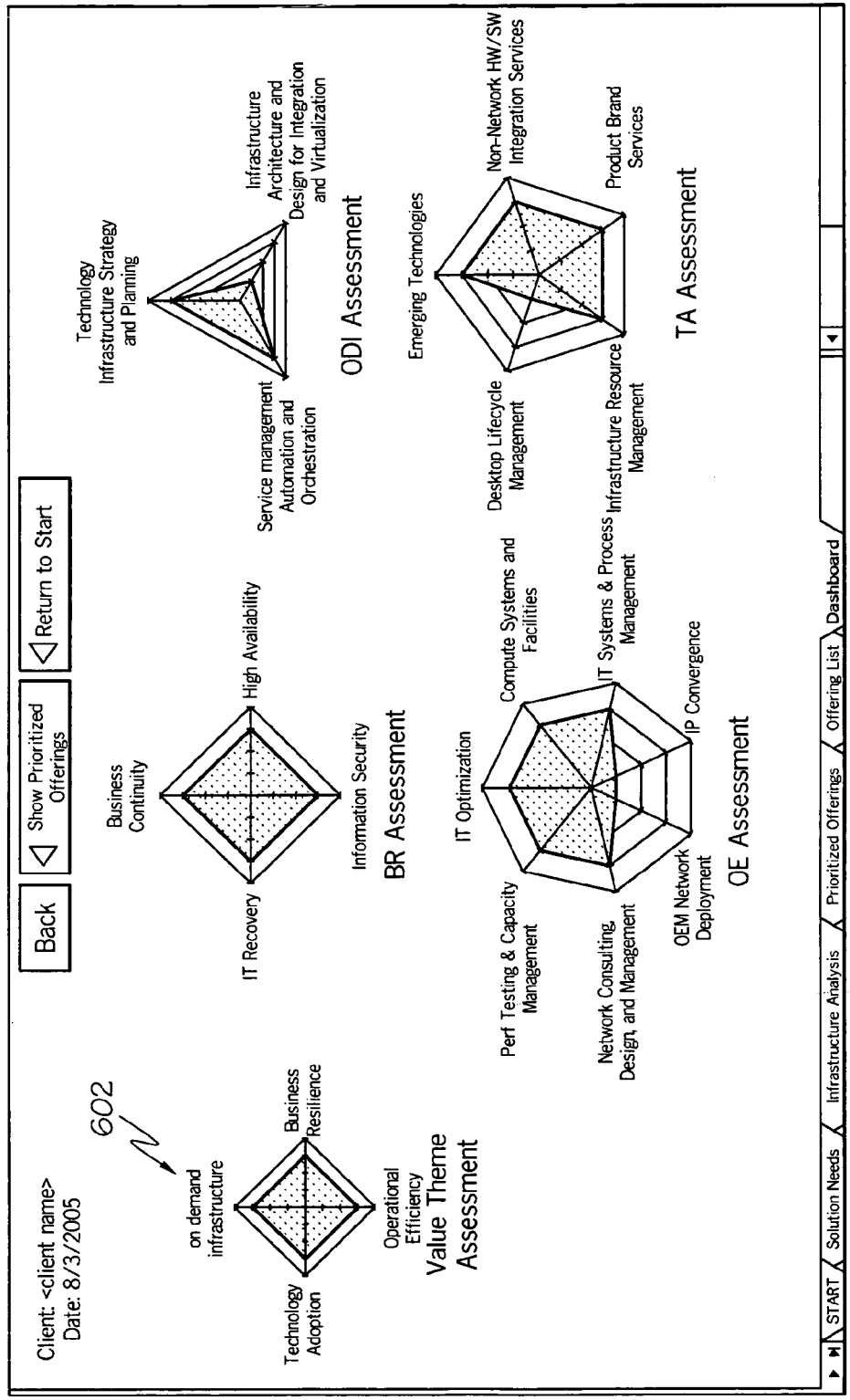
FIG. 13 depicts a dashboard view of the analysis provided according to the present invention.

The present invention also provides the capability to generate output in the form of summaries, reports, and dashboard overviews. Such output is generated and provided by overview system 86 based on the previous operations performed (i.e., in conjunction with FIGS. 3-11). Referring to FIG. 13, an illustrative dashboard view 600 as generated by overview system 86 (FIG. 1B) is depicted. In general, dashboard view 600 provides a graphical depiction of the customer needs as mapped to groupings of business offerings. In FIG. 13, the business offerings have been divided into four different groupings as shown by "spider chart" 602. Each of these four groupings has its own spider chart that shows the highest priority any of the business offerings within the sub-categories of that grouping. The dashboard view 600 enables the user to focus in on which groups of offerings can address the customer needs.

As indicated above, it should be understood that other systems not shown in FIG. 1B could be implemented under the present invention. For example, opportunity assessment system 42 could also include a customer needs customization system that shows industry and/or geography-specific content for customer needs 112. In addition, an offering customization system could be provided that shows industry and/or geography-specific content for business offerings.

While shown and described herein as a method and system for identifying business offerings based on customer needs, it is understood that the invention further provides various alternative embodiments. For example, in one embodiment, the invention provides a computer-readable/useable medium that includes computer program code to enable a computer infrastructure to identify business offerings based on customer needs. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 22 (FIG. 1A) and/or storage system 30 (FIG. 1A) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as a Solution Integrator, could offer to identify business offerings based on customer needs. In this case, the service provider can create, maintain, support, etc., a computer infrastructure, such as computer infrastructure 12 (FIG. 1A) that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for identifying business offerings based on customer needs. In this case, a computer infrastructure, such as computer infrastructure 12 (FIG. 1A), can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 14 (FIG. 1A), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or L'O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A computer-implemented method performed by a computer device for identifying business offerings based on customer needs, comprising:
   receiving, by a customer in a spreadsheet application, a designation of a set of details, the set of details including: a business industry of the customer and a particular business analysis perspective for the customer;
   automatically identifying, via a computer device, a set of customer needs from a set of possible customer needs based on the set of details, the set of possible customer needs being a global set of needs that a customer could possibly have;
   receiving, by the customer, a designation of at least one customer need that applies to the customer from the set of customer needs and a priority of each of the designated customer needs with respect to others of the designated customer needs;
   retrieving a set of possible business offerings, the set of possible business offerings including all business offerings that can be offered to the customer;
   creating, via the computer device, a mapping of customer needs to possible business offerings, the mapping including a column-row matrix of the at least one customer need mapped to the set of possible business offerings and having a numerical value that indicates a priority of each customer need to business offerings combination based on an applicability of the business offering to the customer need and the priority of the customer need;
   identifying, via the computer device a set of applicable business offerings from the set of possible business offerings based on the at least one customer need and the mapping of customer needs to possible business offerings;
   assigning a priority to each of the set of applicable business offerings with respect to others of the set of applicable business offerings; and
   displaying the set of prioritized business offerings and the mapping of customer needs to possible business offerings in the spreadsheet application.

2. The computer-implemented method of claim 1, further comprising:
   displaying the set of customer needs in a hierarchy of rows of a first spreadsheet page, wherein a selection of a parent customer need in the hierarchy automatically results in a selection of any corresponding child customer needs in the hierarchy;
   displaying the set of prioritized business offerings in rows of a second spreadsheet page; and
   displaying the set of possible business offerings in rows of a third spreadsheet page.

3. The computer-implemented method of claim 1, wherein the mapping numerically links the customer needs to the possible business offerings based on the at least one customer need that is selected, and wherein the mapping is provided as a matrix in a fourth spreadsheet page.

4. The computer-implemented method of claim 3, wherein the mapping is based on a rating of the at least one customer need, an affinity of the at least one customer need to the possible business offerings, and a quantity of hits to a possible business offering for a specific customer need at a particular rating level.

5. The computer-implemented method of claim 1, wherein the designation of at least one customer need comprises at least one of the following: a selection of at least one customer need, and a focusing upon of at least one customer need.

6. A system for identifying business offerings based on customer needs, comprising:
   a computer device;
   a detail selection system for receiving, by a customer in a spreadsheet application, a selection of: a business industry of the customer and a view that relates to a particular business analysis perspective;
   a customer needs identification system for automatically identifying a set of customer needs from a set of possible customer needs based on the selection, the set of possible customer needs being a global set of needs that a customer could possibly have;
   a customer needs selection system for receiving, by the customer, a designation of at least one customer need that applies to the customer from the set of customer needs and a priority of each of the designated customer needs with respect to others of the designated customer needs;
   a business offerings identification system for retrieving a set of possible business offerings, the set of possible business offerings including all business offerings that can be offered to the customer;
   a mapper that creates a mapping of customer needs to possible business offerings, the mapping including a column-row matrix of the at least one customer need mapped to the set of possible business offerings and having a numerical value that indicates a priority of each customer need to business offerings combination based on an applicability of the business offering to the customer need and the priority of the customer need;
   a prioritized offering system for identifying a set of applicable business offerings from a set of possible business offerings based on the at least one customer need and the mapping of customer needs to possible business offerings and for assigning a priority to each of the set of applicable business offerings with respect to others of the set of applicable business offerings; and an output for displaying the set of prioritizing business offering and the mapping of customer needs to possible business offerings in the spreadsheet application.

7. The system of claim 6, wherein the set of customer needs are provided in a hierarchy of rows of a first spreadsheet page, wherein a selection of a parent customer need in the hierarchy automatically results in a selection of any corresponding child customer needs in the hierarchy, wherein the set of prioritized business offerings are provided in rows of a second spreadsheet page, and wherein the set of possible business offerings are provided in rows of a third spreadsheet page.

8. The system of claim 6, wherein the mapping numerically links the customer needs to the possible business offerings based on the at least one customer need that is selected, and wherein the mapping is provided as a matrix in a fourth spreadsheet page.

9. The system of claim 8, wherein the mapping is based on a rating of the at least one customer need, an affinity of the at least one customer need to the possible business offerings, and a quantity of hits to a possible business offering for a specific customer need at a particular rating level.

10. The system of claim 6, wherein the designation of at least one customer need comprises at least one of the following: a selection of at least one customer need, and a focusing upon of at least one customer need.

11. A program product stored on a computer readable medium for identifying business offerings based on customer needs, the computer readable medium comprising program code for causing a computer system to perform the following steps:
receiving a designation of a set of details, the set of details including: a customer name, a client name, a customer geography, a business industry of the customer, or a particular business analysis perspective for the customer;
automatically identifying a set of customer needs from a set of possible customer needs based on the set of details, the set of possible customer needs being a global set of needs that a customer could possibly have;
receiving, by the customer, a designation of at least one customer need that applies to the customer from the set of customer needs and a priority of each of the designated customer needs with respect to others of the designated customer needs;
retrieving a set of possible business offerings, the set of possible business offerings including all business offerings that can be offered to the customer;
creating, via the computer device, a mapping of customer needs to possible business offerings, the mapping including a column-row matrix of the at least one customer need mapped to the set of possible business offerings and having a numerical value that indicates a priority of each customer need to business offerings combination based on an applicability of the business offering to the customer need and the priority of the customer need;
identifying a set of applicable business offerings from the set of possible business offerings based on the at least one customer need and the mapping of customer needs to possible business offerings;
assigning a priority to each of the set of applicable business offerings with respect to others of the set of applicable business offerings; and
displaying the set of prioritized business offerings and the mapping of customer needs to possible business offerings in the spreadsheet application.

12. The program product of claim 11, wherein the computer readable medium further comprises program code for causing the computer system to perform the following steps:
displaying the set of customer needs in a hierarchy of rows of a first spreadsheet page, wherein a selection of a parent customer need in the hierarchy automatically results in a selection of any corresponding child customer needs in the hierarchy;
displaying the set of prioritized business offerings in rows of a second spreadsheet page; and
displaying the set of possible business offerings in rows of a third spreadsheet page.

13. The program product of claim 11, wherein the mapping numerically links the customer needs to the possible business offerings based on the at least customer need that is selected, and wherein the mapping is provided in a fourth spreadsheet page.

14. The program product of claim 13, wherein the mapping is based on a rating of the at least one customer need, an affinity of the at least one customer need to the possible business offerings, and a quantity of hits to a possible business offering for a specific customer need at a particular rating level.

15. The program product of claim 11, wherein the designation of at least one customer need comprises at least one of the following: a selection of at least one customer need, and a focusing upon of at least one customer need.

16. A method for deploying an application for identifying business offerings based on customer needs, comprising:
providing a computer infrastructure, the computer infrastructure including a computer device and being operable to:
receive, by a customer in a spreadsheet application, a selection of: a business industry of the customer and a view that relates to a particular business analysis perspective;
automatically identify, via a computer device, a set of customer needs from a set of possible customer needs based on the selection, the set of possible customer needs being a global set of needs that a customer could possibly have;
receive, by the customer, a designation of at least one customer need that applies to the customer from the set of customer needs and a priority of each of the designated customer needs with respect to others of the designated customer needs;
retrieve a set of possible business offerings, the set of possible business offerings including all business offerings that can be offered to the customer;
create, via the computer device, a mapping of customer needs to possible business offerings, the mapping including a column-row matrix of the at least one customer need mapped to the set of possible business offerings and having a numerical value that indicates a priority of each customer need to business offerings combination based on an applicability of the business offering to the customer need and the priority of the customer need;
identify a set of applicable business offerings from the set of possible business offerings based on the at least one customer need and the mapping of customer needs to possible business offerings;
assign a priority to each of the set of applicable business offerings with respect to others of the set of applicable business offerings; and display the set of prioritized business offerings and the mapping of customer needs to possible business offerings in the spreadsheet application.

* * * * *